US012531924B2

(12) United States Patent
Nayak et al.

(10) Patent No.: US 12,531,924 B2
(45) Date of Patent: Jan. 20, 2026

(54) REDUCING AUDIO INTERFERENCE TO A CALL ON A COMPUTING DEVICE

(71) Applicant: QUALCOMM Incorporated, San Diego, CA (US)

(72) Inventors: Anwesha Nayak, Jajpur (IN); Kiran Anil Chikodi, Belagavi (IN); Greeshmalatha Vallury, Hyderabad (IN); Aminul Islam, Kharupetia (IN); Vasudev Senapati, Hyderabad (IN); Pankaj Mulchandani, Raipur (IN); Sreenivasa Reddy Yarram, Hyderabad (IN); Shashi Vardhan Konatham, Hyderabad (IN); Abhinav Shankar, Coimbatore (IN); Manjil Kumar Choudhury, Hyderabad (IN); Vasavi Kancharla, Hyderabad (IN)

(73) Assignee: QUALCOMM INCORPORATED, San Diego, CA (US)

( * ) Notice: Subject to any disclaimer, the term of this patent is extended or adjusted under 35 U.S.C. 154(b) by 120 days.

(21) Appl. No.: 18/322,770

(22) Filed: May 24, 2023

(65) Prior Publication Data

US 2024/0396958 A1    Nov. 28, 2024

(51) Int. Cl.
*G06F 3/048* (2013.01)
*G06F 3/16* (2006.01)
*H04L 51/18* (2022.01)
*H04L 51/222* (2022.01)
*H04L 67/025* (2022.01)

(52) U.S. Cl.
CPC ............ *H04L 67/025* (2013.01); *G06F 3/165* (2013.01); *H04L 51/18* (2013.01); *H04L 51/222* (2022.05)

(58) Field of Classification Search
None
See application file for complete search history.

(56) References Cited

U.S. PATENT DOCUMENTS

| 11,575,721 | B2* | 2/2023 | Xi | H04L 65/1093 |
| 2013/0072251 | A1 | 3/2013 | Kim et al. | |
| 2021/0258427 | A1* | 8/2021 | Lee | H04L 12/1831 |
| 2023/0027833 | A1* | 1/2023 | Das | G06F 3/165 |
| 2023/0244437 | A1* | 8/2023 | Doken | G06F 3/165 |
| | | | | 381/57 |

(Continued)

FOREIGN PATENT DOCUMENTS

EP    3128727 A1    2/2017

OTHER PUBLICATIONS

International Search Report and Written Opinion—PCT/US2024/021335—ISA/EPO—Jul. 5, 2024. 14 pages.

*Primary Examiner* — Thanh T Vu
(74) *Attorney, Agent, or Firm* — MUNCY, GEISSLER, OLDS & LOWE, P.C.

(57) ABSTRACT

Methods for reducing audio interference to a call on a computing device may include, in response to the computing device entering a high priority call state, transmitting to one or more other computing devices via a distributed context network a message configured to cause the one or more other computing devices to reduce audio output volume. The one or more other computing devices may receiving via the distributed context network a message indicating that the computing device has entered a high priority call state, and may reduce audio output volume in response to receiving the message.

10 Claims, 15 Drawing Sheets

(56) References Cited

U.S. PATENT DOCUMENTS

2023/0297322 A1\* 9/2023 Peterson .................. H04R 3/00
                                                     381/107
2024/0106899 A1\* 3/2024 Johnson .................. H04L 67/12

\* cited by examiner

REDUCING AUDIO INTERFERENCE TO A CALL ON A COMPUTING DEVICE

BACKGROUND

Telecommunications are an essential aspect of everyday modern life. Yet it is increasingly difficult to conduct or participate in a call without being interrupted by an intruding noise from another ringing phone, an audio notification of a message or event, the television in the next room, a game console, or other similar audible interruptions. Such interruptions when one is on a work call or in an online meeting can be embarrassing as well as unwelcome.

SUMMARY

Various aspects include methods that may be implemented on a processor of a computing device that may be configured to reduce audio interference to a call on another computing device. In some aspects, in response to the computing device entering a high priority call state, the computing device may transmit to one or more other computing devices via a distributed context network a message configured to cause the one or more other computing devices to reduce audio output volume.

Some aspects may include recognizing that the computing device has entered a high priority call state when a microphone of the computing device is unmuted. In some aspects, the message transmitted to the one or more other computing devices may include a priority call alert indicating that the one or more other computing devices should reduce respective audio output volume. In some aspects, the message transmitted to the one or more other computing devices may include a threshold volume level and may be configured to cause the one or more other computing devices to reduce audio output volume below the threshold volume level included in the message.

Some aspects may include determining whether audio output from the one or more other computing devices that is received by the computing device exceeds a volume threshold, selecting one or more other computing devices based on the audio output received by the computing device that exceeds the volume threshold, and transmitting the message to the selected one or more other computing devices. Some aspects may include determining a distance to each other computing device on the distributed context network, selecting one or more other computing devices based on the distance to each other computing device on the distributed context network, and transmitting the message to the selected one or more other computing devices.

Some aspects may include conducting a calibration operation with each other computing device on the distributed context network in which each other computing device emits sound at a predetermined level and the computing device measures a volume of the received sound, selecting one or more other computing devices based on measurements of the volume of the received sound by each other computing device determined during the calibration operation, and transmitting the message to the selected one or more other computing devices.

Some aspects may include, in response to exiting the high priority call state, transmitting to the one or more other computing devices via the distributed context network a message indicating that audio output reductions are ended.

Further aspects may include a processor for use in a computing device configured to perform operations of any of the methods summarized above. Further aspects may include a computing device including means for performing functions of any of the methods summarized above. Further aspects may include a computing device configured with processor-executable instructions to perform operations of any of the methods summarized above.

Various aspects may include further methods that may be implemented on a processor of a computing device that may be configured to reduce audio interference to a call on another computing device. Some aspects may include receiving via a distributed context network a message indicating that another computing device has entered a high priority call state, and reducing audio output volume of the computing device in response to receiving the message.

In some aspects, reducing audio output volume of the computing device may include reducing audio volume of the computing device below a threshold volume level. In some aspects, the threshold volume level may be indicated in the received message.

Some aspects may include, in response to receiving the message indicating that the other computing device has entered the high priority call state, receiving a notification intended for a user of the other computing device, and sending information regarding the notification to the other computing device in a manner that informs the user but does not interrupt the high priority call. Some aspects may include, in response to receiving a user input to increase the audio output volume of the computing device, presenting a confirmation request requiring a second user input before increasing the audio output.

Further aspects may include a processor for use in a computing device configured to perform operations of any of the methods summarized above. Further aspects may include a computing device including means for performing functions of any of the methods summarized above. Further aspects may include a computing device configured with processor-executable instructions to perform operations of any of the methods summarized above.

BRIEF DESCRIPTION OF THE DRAWINGS

The accompanying drawings, which are incorporated herein and constitute part of this specification, illustrate example embodiments, and together with the general description given above and the detailed description given below, serve to explain the features of various embodiments.

DETAILED DESCRIPTION

Figure 1:
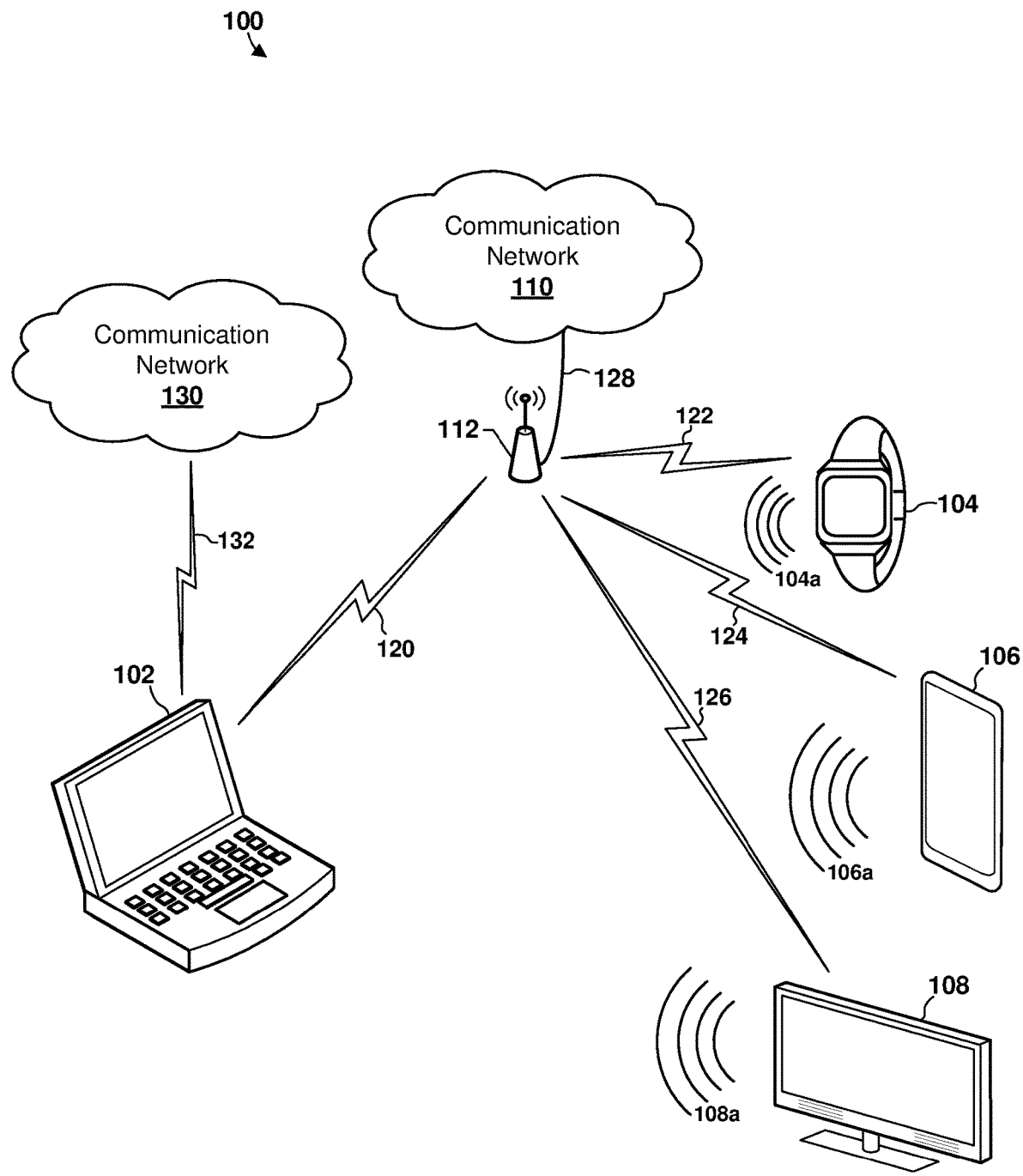
FIG. 1 is a system block diagram illustrating an example communications system suitable for implementing various embodiments.

Various embodiments will be described in detail with reference to the accompanying drawings. Wherever possible, the same reference numbers will be used throughout the drawings to refer to the same or like parts. References made to particular examples and embodiments are for illustrative purposes, and are not intended to limit the scope of the claims.

Various embodiments include methods that may be implemented on a processor of a computing device to reduce audio interference on calls (such as phone calls, online meetings, and other similar audio or audiovisual communication sessions) caused by the audio output of other computing devices on a network, such as a distributed context network, by sending messages to request reduced volume levels of the other computing devices on a network. In response to the computing device entering a high priority call state, the computing device may transmit a message requesting reduced volume or muting to one or more other computing devices that are on the distributed context network. By causing the other computing devices to reduce their audio output volume, the embodiment methods may reduce audio interference to a call that would otherwise be caused by audio output from other computing devices in the vicinity of the computing device.

As used herein, the term "computing device" refers to an electronic device equipped with at least a processor, memory, and wireless communication devices such as a transceiver and antenna configured to enable communication with wireless communication devices and networks. A computing device may include any one or all of smart glasses, augmented/virtual reality devices, cellular telephones, smartphones, portable computing devices, personal or mobile multi-media players, laptop computers, tablet computers, 2-in-1 laptop/table computers, smart-books, ultrabooks, multimedia Internet-enabled cellular telephones, wearable devices including smart-watches and smart-contact lenses, entertainment devices (e.g., wireless gaming controllers, music and video players, satellite radios, etc.), and similar electronic devices that include a memory, wireless communication components and a programmable processor. As used herein, the term "smart" in conjunction with a device, refers to a device that includes a processor for automatic operation, for collecting and/or processing of data, and/or may be programmed to perform all or a portion of the operations described with regard to various embodiments. For example, a smart-phone, smart-glasses, smart-contact lenses, smart-watch, smart-ring, smart-necklace, smart-cup, smart-straw, smart-appliances, etc.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single wireless device. The proximity of the SOCs facilitates high speed communications and the sharing of memory and resources.

As used herein, the terms "component," "system," "unit," "module," and the like include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a communication device and the communication device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

Telecommunications are an essential aspect of everyday modern life. Yet it is increasingly difficult to conduct or participate in a call without being interrupted by an intruding noise from another ringing phone, an audio notification of a message or event, the television in the next room, a game console, or other similar audible interruptions. While in a meeting or on call, such accidental audio disturbances may lead to uncomfortable situations. Audible interruptions when one is on a work call or in an online meeting can be embarrassing as well as unwelcome. For example, a participant in an online meeting may forget to put their mobile phone on silent, which interrupts the online meeting with a ringtone or notification of an incoming call or message. Similarly, audio from nearby televisions, radios, game devices, and other computing devices may interrupt a call.

Various embodiments include methods of reducing audio interference to a call on a computing device. Various embodiments may include in response to the computing device entering a high priority call state, transmitting to one or more other computing devices via a distributed context network a message configured to cause the one or more other computing devices to reduce audio output volume.

In various embodiments, the computing device and the other computing device(s) may communicate via a local communication network, referred to herein as a "distributed context network." In some embodiments, the local communication network may include a plurality of computing devices that share context information, access to functionality or information, or other features or functionality, and may provide sufficient communication infrastructure to enable a message or messages transmitted by one computing device to cause one or more other computing devices to reduce their respective audio output volume.

In some embodiments, the computing device may recognize when the computing device has entered a high priority call state in which muting or reducing volume of other computing devices is appropriate when computing device is conducting a call and a microphone of the computing device is unmuted. For example, the computing device may execute a function that mutes the microphone and/or speakers of the computing device, or blocks or refrains from transmitting an audio signal to the call. As another example, the computing device may execute a function that blocks or refrains from an audio signal received from the microphone to an application by which the computing device participates in the call.

In some embodiments, the message transmitted by the computing device to the one or more other computing devices includes a priority call alert indicating that the one or more other computing devices should reduce respective audio output volume. In some embodiments, the message transmitted by the computing device to the one or more other computing devices includes a priority call alert indicating that the computing device is participating in a call. For example, from time to time computing devices that are connected to (in communication with) the distributed context network may transmit to other computing devices, or broadcast to other computing devices, information indicating operating state(s), operations being performed, applications being executed, and other state information. In some embodiments, the message may include a distributed context network that is configured according to a protocol of the distributed context network (for example, a "high priority call alert").

In some embodiments, a distributed context network message may be configured to include parameters and values associated with the parameters that indicate information about a computing device. Table 1 shows an example of a distributed context network message.

TABLE 1

| Parameter | Value |
| --- | --- |
| Device ID | <Unique Device ID registered in distributed context network> |
| Device Name | <Device Name> |
| Device Type | <Device Type, e.g. Smart Phone> |
| Apps | <App name, e.g. Microsoft Teams> |
| Status | <e.g., Active> |
| Request_Type | <e.g., Meeting mode> |
| Meeting_Mode_Requests | <[Optional] Parameter Values (e.g., Threshold)> |

A value of a Device ID (identifier) parameter may indicate a unique computing device ID in the distributed context network. A value of a Device Name parameter may indicate a unique name of the computing device. A value of a Device Type parameter may indicate a type of computing device, such as a smart phone, tablet, smart watch, laptop, etc. A value of an Apps parameter may indicate one or more applications executing on and/or available on the computing device. A value of a Status parameter may indicate an operating status of the computing device, such as active, sleep or low power mode, and the like.

A value of a Request_Type parameter may indicate, for example, that the computing device has entered a high priority call state. In some embodiments, a value of the Request_Type parameter may function as a "high priority call alert" to other computing devices in the distributed context network. A value of the Meeting_Mode_Requests parameter (which may be optional) may indicate information related to the Request_Type parameter. For example, such a value may include, or may indicate, a threshold volume level for the receiving computing devices. In some embodiments, the message may be configured to cause the one or more other computing devices to reduce audio output volume below the threshold volume level specified in the message.

In some embodiments, the computing device may determine whether to send the message configured to cause other computing devices to reduce audio output volume based on priority information associated with the call. In some embodiments, a call indicated as or designated a "work call" or "business call" may be associated with high priority, while a call designated a "personal call" or "non-work call" may be associated with a low priority. For example, the call may be associated with an indication that it is a work call or business call. Such an indication may be provided in an input received from a user. The computing device may recognize a high priority call based on a phone number, conversation identifier, priority indicator, or other suitable information associated with the call that indicates a level of priority of the call. In some embodiments, the computing device may automatically transmit or broadcast the message to other computing devices in response to determining that the computing device has entered a high priority call state. In some embodiments, the computing device may transmit or broadcast the message to other computing devices in response to receiving an input from a user.

In some embodiments, the message may be configured to cause the one or more other computing devices to mute their respective audio output volume (for example, by muting an audio output volume, by entering a "silent" or "vibrate" mode, or by performing another suitable operation). In some embodiments, the message transmitted or broadcast to the one or more other computing devices may include a threshold volume level for the receiving computing devices. In such embodiments, the message may be configured to cause the one or more other computing devices to reduce audio output volume below the threshold volume level specified in the message. In some embodiments, the computing device may be configured to dynamically determine the threshold volume level. In some embodiments, the computing device may be configured to dynamically determine a threshold volume level for each other computing device, such as based on separation distance, volume level measured by the microphone, or a previous calibration. Thus, the threshold volume specified in the messages to other computing devices may be different for each other device. For example, a laptop computer that is participating in a call (e.g., an online meeting) may determine a first threshold volume level (e.g., low volume) for a cell phone positioned on the desk next to the laptop computer, a second threshold volume level (e.g., moderate volume) for a smart television in an adjacent room, and the third threshold volume level (e.g., a high volume) for a game console located in a room on a different floor.

In some embodiments, the computing device may select the other computing devices to which the message the message is transmitted while not sending the message to non-selected computing devices. In some embodiments, the computing device may determine whether audio output from the one or more other computing devices that is received by the computing device exceeds a volume threshold, select from among the other computing devices one or more that should receive the message based on the sounds (audio output) received by a microphone of the computing device exceeding the volume threshold, and transmit the message to the selected other computing devices. In some embodiments, the computing device may determine a distance to each other computing device on the distributed context network, select from among the one or more other computing devices based on the distance to each other computing device on the distributed context network, and transmit the message to the selected one or more other computing devices.

In some embodiments, the computing device may be configured to perform or conduct a calibration operation to determine an appropriate threshold volume level for each other computing device. In some embodiments, the computing device may send messages configured to cause each other computing device to emit a calibration sound at a predetermined volume, such as a range of tones or pulses at different frequencies. Based on the sound volume detected by the computing device when each other computing device emits its calibration sound, the computing device may determine or select a threshold volume level for each other computing device, as well as identify other computing devices that will not cause audio interference (e.g., due to their isolation or separation distance). The determined threshold volume levels of all other computing devices on the network may be stored in memory so that the level information can be accessed by a processor of the computing device when a high priority call is initiated with the level information then used to select the one or more other computing devices that should receive a volume reduction request message and the threshold volume level to specify in the messages to each selected computing device.

In some embodiments, the computing device may transmit to the one or more other computing devices an indication that the computing device has exited (ended, terminated, left) the high priority call state. In some embodiments, in response to exiting the high priority call state, the computing device may transmit or broadcast to the one or more other computing devices via the distributed context network a message indicating that audio output reductions are ended.

In various embodiments, a computing device (e.g., one of the one or more other computing devices) may be configured to receive via a distributed context network a message indicating that another computing device has entered a high priority call state, and reduce its audio output volume in response to receiving the message. In some embodiments, the received message may indicate a threshold volume level, and the computing device respond to the message by reducing its audio output volume level to or below the indicated threshold volume level.

In some embodiments, a computing device (e.g., one of the one or more other computing devices) may receive a message or notification for a user of the computing device participating in the call, and may send information regarding the notification to the computing device participating in the call in a manner that informs the user but does not interrupt the high priority call. In such embodiments, after receiving the message indicating that the other computing device (e.g., the laptop computer) has entered the high priority call state, the computing device (e.g., the cell phone, the smart watch, etc.) may receive a notification (e.g., an incoming call, text, email or other message) intended for the user of the other computing device (e.g., the laptop computer), and in response send information regarding the notification to the other computing device (e.g., to the laptop computer) in a manner that informs the user but does not interrupt the high priority call (e.g., by displaying a visible yet unobtrusive notification or message). For example, a user's laptop computer may be supporting a video conference when another user's device nearby, such as a smartphone, receives a text message or another incoming call. Having reduced audio output volume in response to a message from the laptop computer, the smart phone may transmit a message to the laptop computer in a format that will cause a message to appear to inform the user without disturbing the video conference call.

In some embodiments, a computing device (e.g., one of the one or more other computing devices) that has reduced its volume in response to a volume reduction request message may receive a user input to increase the volume of the computing device, and in response present a confirmation request requiring a second user input before increasing the audio output. For example, a television or game console that has reduced its audio output volume in response to receiving a volume reduction request message may receive a user input (e.g., a button press, a remote control signal, or another suitable input) to increase the audio output volume. In response to such an input, the computing device may display a confirmation request, a warning, or another suitable indication that requires a second user input to confirm the request before increasing the audio output. In some embodiments, the confirmation request may be presented as a question such as "Increase volume—Are you sure?", "Laptop is on a work call—Increase volume?" or another suitable confirmation request.

Various embodiments improve the utility and effectiveness of operations of computing devices by enabling a computing device to reduce audio interference to a call caused by another computing device.

FIG. 1 is a system block diagram illustrating an example communications system 100 suitable for implementing various embodiments. The communication system 100 may include a first computing device 102, a second computing device 104, a third computing device 106, fourth computing device 108, and a communication network 110.

The computing devices 102, 104, 106, and 108 may each communicate with each other via the communication network 110. The computing devices 102, 104, 106, and 108 may include radio frequency (RF) circuitry and an antenna to enable wireless communication with the communication network 110 via an access point 112 over wireless communication links 120, 122, 124, and 126. The access point 112 may communicate with the communication network 110 via a communication link 128. Each of the computing devices 102, 104, 106, and 108 may send and receive messages from the other computing devices that enable the computing devices 102, 104, 106, and 108 to participate in a distributed context network. Each of the computing devices 102, 104, 106, and 108 may send and receive messages including information about computing device status, computing device operations, and whether a computing device has entered a high priority call state, among other things.

The computing device 102 also may communicate via wireless communication link 132 with a communication network 130 to participate in a call. The computing devices 104, 106, and 108 each may emit audio 104a, 106a, 108a, that may be received by a microphone of the computing device 102 and transmitted to the call. In various embodiments, as further described below, in response to the computing device 102 entering a high priority call state (e.g., entering a state in which received audio may be transmitted to a call), the computing device 102 may transmit to the one or more other computing devices 104, 106, 108 via a distributed context network a message configured to cause the one or more other computing devices 104, 106, 108 to reduce audio output volume of audio 104a, 106a, or 108a, respectively. While the computing devices 102, 104, 106, and 108 are illustrated as a laptop computer, a smart watch, a cell phone or tablet computer, and a smart television, these illustrations are merely exemplary and are not limitations on the forms or functions of computing devices 102, 104, 106, and 108.

Figure 2:
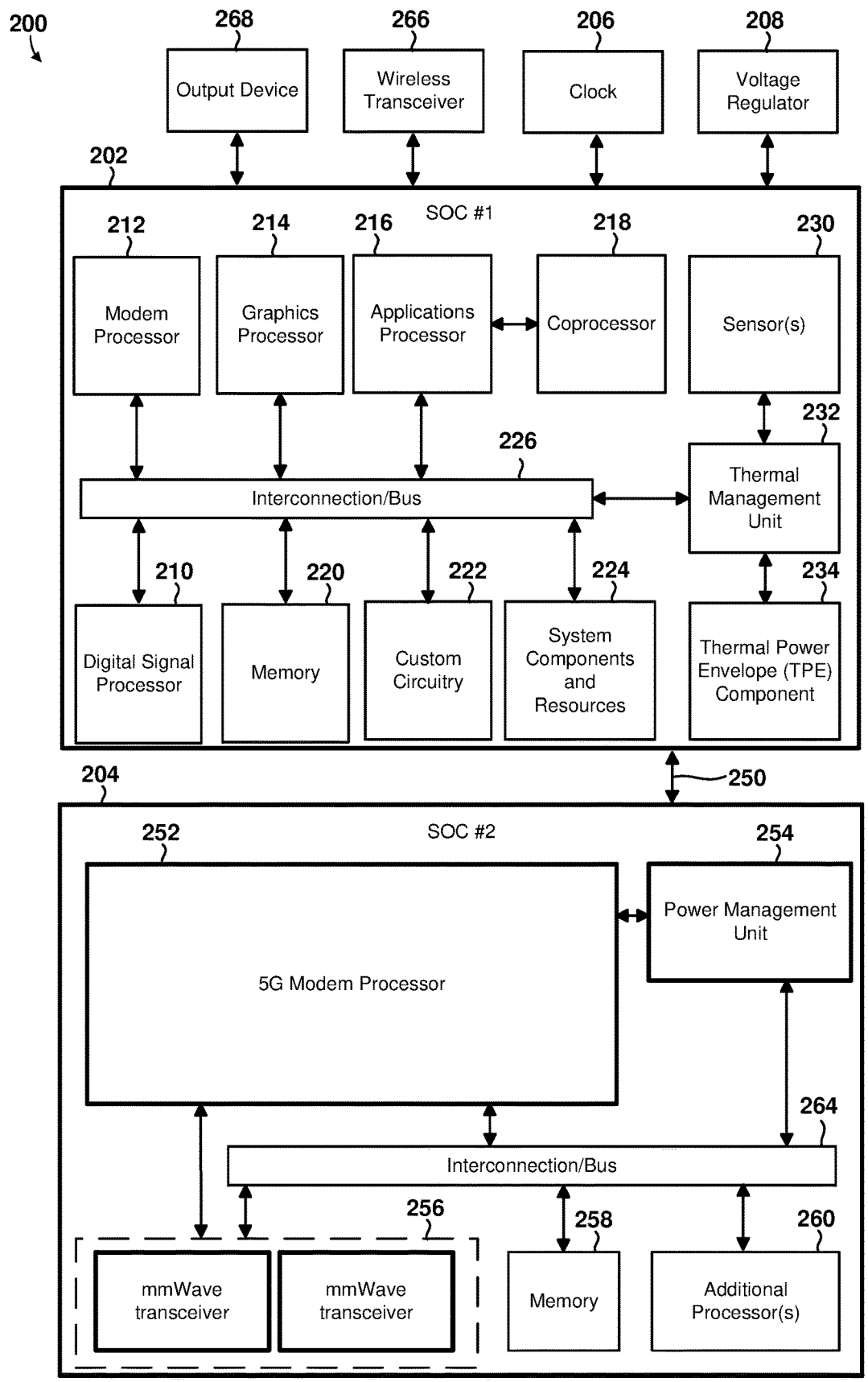
FIG. 2 is a component block diagram illustrating an example computing system including a wireless modem suitable for implementing various embodiments.

FIG. 2 is a component block diagram illustrating an example computing system 200 including a wireless modem suitable for implementing various embodiments. With reference to FIGS. 1 and 2, the illustrated example processing system 200 includes two SOCs 202, 204, a clock 206, a voltage regulator 208, a wireless transceiver 266, and a an output device 268 such as a display device, a sound output device (e.g., a speaker), a haptic feedback device, etc. In some embodiments, the first SOC 202 operates as central processing unit (CPU) of the wireless device that carries out the instructions of software application programs by performing the arithmetic, logical, control and input/output (I/O) operations specified by the instructions. In some embodiments, the second SOC 204 may operate as a specialized processing unit. For example, the second SOC 204 may operate as a specialized 5G processing unit responsible for managing high volume, high speed (e.g., 5 Gbps, etc.), and/or very high frequency short wavelength (e.g., 28 GHz millimeter wave (mmWave) spectrum, etc.) communications.

The first SOC 202 may include a digital signal processor (DSP) 210, a modem processor 212, a graphics processor 214, an application processor 216, one or more coprocessors 218 (e.g., vector co-processor) connected to one or more of the processors, memory 220, custom circuitry 222, system components and resources 224, an interconnection/bus module 226, one or more sensors 230 (e.g., thermal sensors, motion sensors, proximity sensors, a multimeter, etc.), a thermal management unit 232, and a thermal power envelope (TPE) component 234. The second SOC 204 may include a 5G modem processor 252, a power management unit 254, an interconnection/bus module 264, memory 258, and various additional processors 260, such as an applications processor, packet processor, etc. The second SOC 204 may further be coupled to a plurality of mmWave transceivers 256, which may be separate integrated circuits that are radio frequency shielded on or packaged separate from the second SOC 204 as indicated by the dashed line.

Each processor 210, 212, 214, 216, 218, 252, 260 may include one or more cores, and each processor/core may perform operations independent of the other processors/cores. For example, the first SOC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 and/or custom circuitry 222 may also include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SOCs 202, 204 may further include an input/output module (not illustrated) for communicating with resources external to the SOC, such as a clock 206 and a voltage regulator 208. Resources external to the SOC (e.g., clock 206, voltage regulator 208) may be shared by two or more of the internal SOC processors/cores.

In addition to the example processing system 200 discussed above, various embodiments may be implemented in a wide variety of computing systems, which may include a single processor, multiple processors, multicore processors, or any combination thereof. In some embodiments, only one SOC (e.g., 202, 204) may be used in a less capable computing device that are configured to provide sensor information to a more capable computing device, such as a computing device 102, 140.

Figure 3:
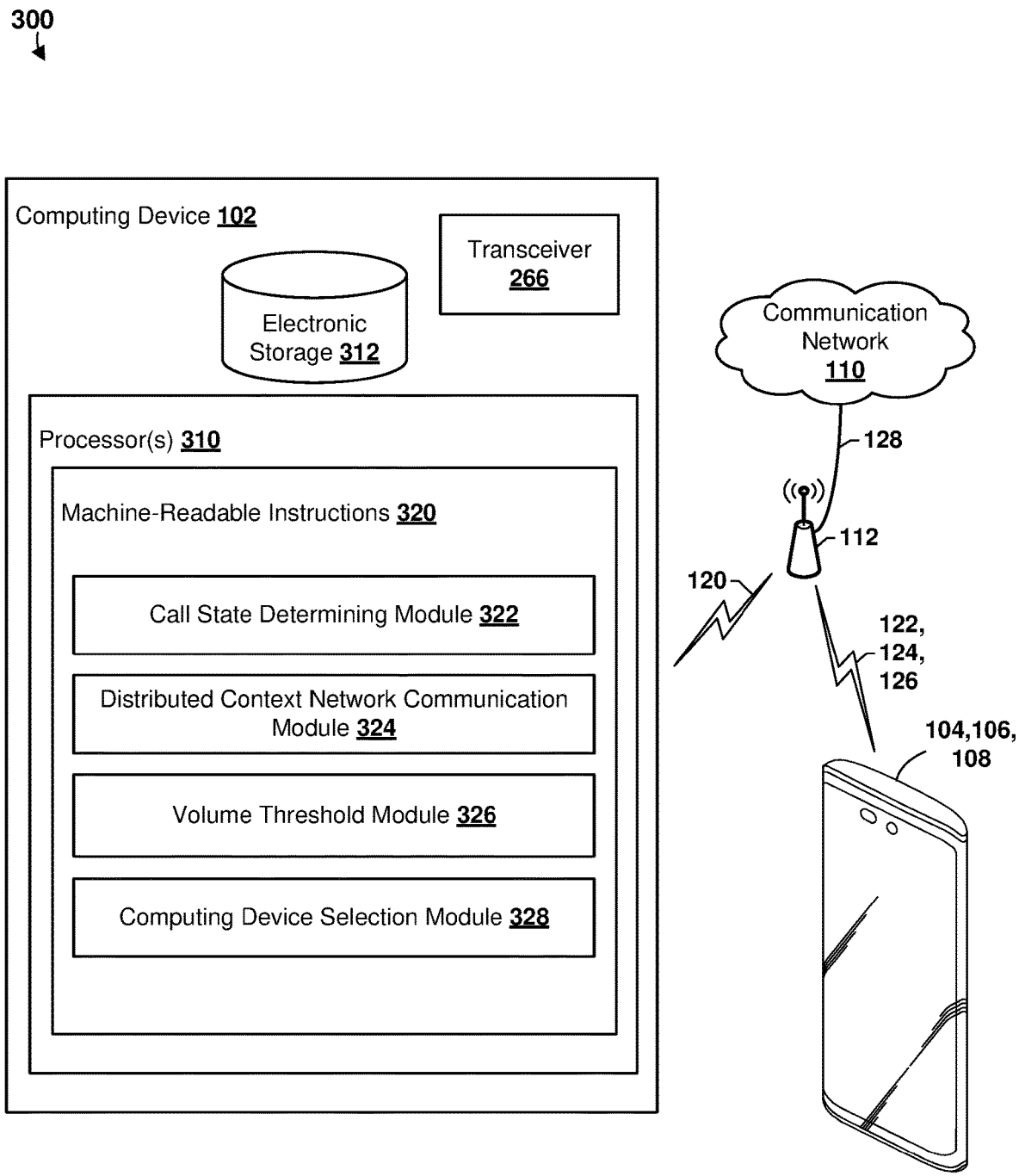
FIG. 3 is a component block diagram illustrating a system configured to enable reducing audio interference to a call on a computing device in accordance with various embodiments.

FIG. 3 is a component block diagram illustrating a system 300 configured to enable reducing audio interference to a call on a computing device in accordance with various embodiments. With reference to FIGS. 1-3, the system 300 may include a computing device (e.g., 102), another computing device (e.g., 104, 106, 108), communication network 110, and access point 108.

The computing device 102 may include one or more processors 310, electronic storage 412, a transceiver 266 (e.g., wireless transceiver), and other components. The computing device 102 may include a plurality of hardware, software, and/or firmware components operating together to provide the functionality attributed herein to the computing device 102.

Electronic storage 312 may include non-transitory storage media that electronically stores information. The electronic storage media of electronic storage 412 may include one or both of system storage that is provided integrally (i.e., substantially non-removable) with the computing device 102 and/or removable storage that is removably connectable to the computing device 102 via, for example, a port (e.g., a universal serial bus (USB) port, a firewire port, etc.) or a drive (e.g., a disk drive, etc.). In various embodiments, electronic storage 312 may include one or more of electrical charge-based storage media (e.g., EEPROM, RAM, etc.), solid-state storage media (e.g., flash drive, etc.), optically readable storage media (e.g., optical disks, etc.), magnetically readable storage media (e.g., magnetic tape, magnetic hard drive, floppy drive, etc.), and/or other electronically readable storage media. Electronic storage 312 may include one or more virtual storage resources (e.g., cloud storage, a virtual private network, and/or other virtual storage resources). Electronic storage 312 may store software algorithms, information determined by processor(s) 310, information received from the computing devices 140, 106, 108, and/or other information that enables the computing device 102 to function as described herein.

Figure 4:
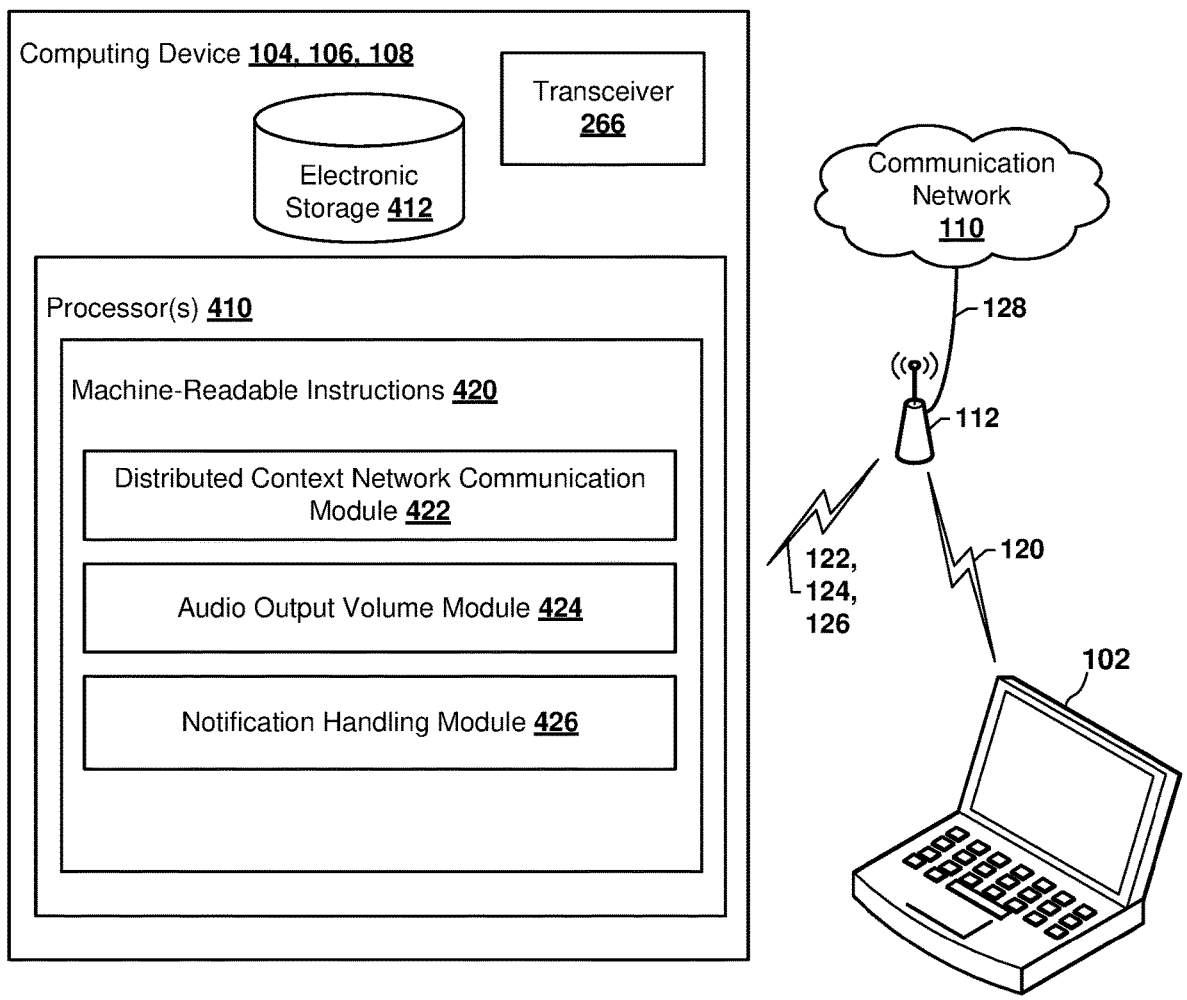
FIG. 4 is a component block diagram illustrating a system configured to enable managing audio output of a computing device in accordance with various embodiments.

Processor(s) 310 may include one of more local processors (e.g., 210, 212, 214, 216, 218, 260), which may be configured to provide information processing capabilities in the computing device 102. As such, processor(s) 310 may include one or more of a digital processor, an analog processor, a digital circuit designed to process information, an analog circuit designed to process information, a state machine, and/or other mechanisms for electronically processing information. Although processor(s) 310 is shown in FIG. 4 as a single entity, this is for illustrative purposes only. In some embodiments, processor(s) 310 may include a plurality of processing units. These processing units may be physically located within the same device, or processor(s) 310 may represent processing functionality of a plurality of devices operating in coordination.

The computing device 102 may be configured by machine-readable instructions 420, which may include one or more instruction modules. The instruction modules may include computer program modules. In various embodiments, the instruction modules may include one or more of a call state determining module 322, a distributed context network communication module 324, a volume threshold module 326, and a computing device selection module 328.

The call state determining module 322 may be configured to determine whether the computing device 102 has entered a high priority call state. For example, the call state determining module 322 may be configured to recognize (determine, identify) that the computing device has entered a high priority call state when a microphone of the computing device is unmuted.

The distributed context network communication module 324 may be configured to transmit to one or more other computing devices (e.g., 104, 106, 108) via a distributed context network a message configured to cause the one or more other computing devices to reduce audio output volume. In some embodiments, the distributed context network communication module 324 may be configured to transmit the message to one or more selected other computing devices. The distributed context network communication module 324 may be configured to determine a distance to each other computing device on the distributed context network. The distributed context network communication module 324 may be configured to transmit to the one or more other computing devices via the distributed context network a message indicating that audio output reductions are ended in response to exiting the high priority call state.

The volume threshold module 326 may be configured to determine a threshold volume level. In some embodiments, the threshold volume module 326 may provide the determined threshold volume level to the distributed context network communication module 324 for transmission to the one or more other computing devices (e.g., 104, 106, 108). The volume threshold module 326 may be configured to determine whether audio output from the one or more other computing devices that is received by the computing device exceeds a volume threshold.

The computing device selection module 328 may be configured to select from among the one or more other computing devices based on the audio output received by the computing device that exceeds the volume threshold. The computing device selection module 328 may be configured to determine a distance to each other computing device on the distributed context network. The computing device selection module 328 may be configured to conduct a calibration operation with each other computing device on the distributed context network in which each other computing device emits sound at a predetermined level and the computing device measures a volume of the received sound, and select from among the one or more other computing devices based on measurements of the volume of the received sound by each other computing device determined during the calibration operation.

The processor(s) 310 may be configured to execute the modules 322-328 and/or other modules by software, hardware, firmware, some combination of software, hardware, and/or firmware, and/or other mechanisms for configuring processing capabilities on processor(s) 310. The description of the functionality provided by the different modules 322-328 is for illustrative purposes, and is not intended to be limiting, as any of modules 322-328 may provide more or less functionality than is described. For example, one or more of modules 322-328 may be eliminated, and some or all of its functionality may be provided by other ones of modules 322-328. As another example, processor(s) 310 may be configured to execute one or more additional modules that may perform some or all of the functionality attributed below to one of modules 322-328.

FIG. 4 is a component block diagram illustrating a system 400 configured to enable managing audio output of a computing device in accordance with various embodiments. With reference to FIGS. 1-4, the system 400 may include a computing device (e.g., 102), another computing device (e.g., 104, 106, 108), communication network 110, and access point 108.

The computing device 104, 106, 108 may include one or more processors 410, electronic storage 412, a transceiver 266 (e.g., wireless transceiver), and other components. The computing device 104, 106, 108 may include a plurality of hardware, software, and/or firmware components operating together to provide the functionality attributed herein to the computing device 104, 106, 108.

Electronic storage 412 may include non-transitory storage media that electronically stores information. The electronic storage media of electronic storage 412 may include one or both of system storage that is provided integrally (i.e., substantially non-removable) with the computing device 104, 106, 108 and/or removable storage that is removably connectable to the computing device 104, 106, 108 via, for example, a port (e.g., a universal serial bus (USB) port, a firewire port, etc.) or a drive (e.g., a disk drive, etc.). In various embodiments, electronic storage 412 may include one or more of electrical charge-based storage media (e.g., EEPROM, RAM, etc.), solid-state storage media (e.g., flash drive, etc.), optically readable storage media (e.g., optical disks, etc.), magnetically readable storage media (e.g., magnetic tape, magnetic hard drive, floppy drive, etc.), and/or other electronically readable storage media. Electronic storage 412 may include one or more virtual storage resources (e.g., cloud storage, a virtual private network, and/or other virtual storage resources). Electronic storage 412 may store software algorithms, information determined by processor(s) 410, information received from the computing devices 140, 106, 108, and/or other information that enables the computing device 104, 106, 108 to function as described herein.

Processor(s) 410 may include one of more local processors (e.g., 210, 212, 214, 216, 218, 260), which may be configured to provide information processing capabilities in the computing device 104, 106, 108. As such, processor(s) 410 may include one or more of a digital processor, an analog processor, a digital circuit designed to process information, an analog circuit designed to process information, a state machine, and/or other mechanisms for electronically processing information. Although processor(s) 410 is shown in FIG. 4 as a single entity, this is for illustrative purposes only. In some embodiments, processor(s) 410 may include a plurality of processing units. These processing units may be physically located within the same device, or processor(s) 410 may represent processing functionality of a plurality of devices operating in coordination.

The computing device 104, 106, 108 may be configured by machine-readable instructions 420, which may include one or more instruction modules. The instruction modules may include computer program modules. In various embodiments, the instruction modules may include one or more of a distributed context network communication module 422, and audio output volume module 424, and a notification handling module 426.

The distributed context network communication module 422 may be configured to receiving via a distributed context network a message indicating that another computing device (e.g., 102) has entered a high priority call state.

The audio output volume module 424 may be configured to reduce audio output volume of the computing device in response to receiving the message. In some embodiments, reducing audio output volume of the computing device may include reducing audio volume of the computing device below a threshold volume level. In some embodiments, the threshold volume level may be indicated in the received message.

The notification handling module 426 may be configured to receive a notification intended for a user of the other computing device, and send information regarding the notification to the other computing device in a manner that informs the user but does not interrupt the high priority call. The notification handling module 426 may be configured to present a confirmation request requiring a second user input before increasing the audio output in response to receiving a user input to increase the audio output volume of the computing device.

The processor(s) 410 may be configured to execute the modules 422-426 and/or other modules by software, hardware, firmware, some combination of software, hardware, and/or firmware, and/or other mechanisms for configuring processing capabilities on processor(s) 410. The description of the functionality provided by the different modules 422-426 is for illustrative purposes, and is not intended to be limiting, as any of modules 422-426 may provide more or less functionality than is described. For example, one or more of modules 422-426 may be eliminated, and some or all of its functionality may be provided by other ones of modules 422-426. As another example, processor(s) 410 may be configured to execute one or more additional modules that may perform some or all of the functionality attributed below to one of modules 422-426.

Figure 5:
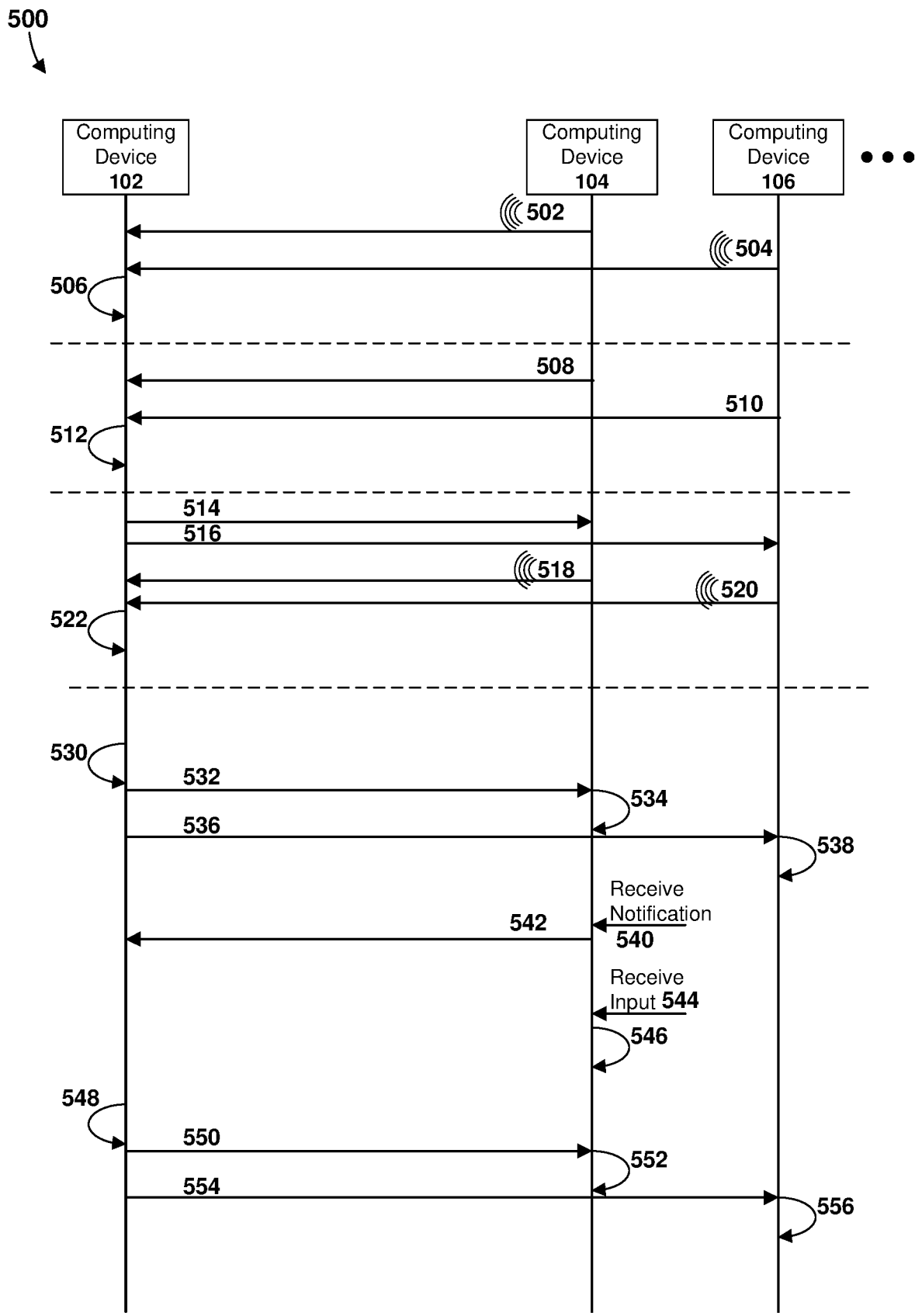
FIG. 5 is a message flow diagram illustrating an example method that may be performed by a processing device of a computing device for reducing audio interference to a call on a computing device in accordance with various embodiments.

FIG. 5 is a message flow diagram illustrating an example method 500 that may be performed by a processing device of a computing device (e.g., 102, 104, 106) for reducing audio interference to a call on a computing device in accordance with various embodiments. With reference to FIGS. 1-5, means for performing each of the operations of the method 500 may include a processor (e.g., 202, 204, 210, 212, 214, 216, 218, 260, 310) of the computing devices (e.g., 102, 104, 106), referred to herein a "processor." In various embodiments, the computing devices 102, 104, 106 may be participants in, and may communicate via, a distributed context network. While the method 500 is illustrated involving three computing devices 102, 104, 106 for clarity, additional computing devices also may perform one or more of the operations described below.

In some embodiments, the computing device 102 may receive audio output 502 from the computing device 104 and/or audio output 504 from the computing device 106. In operation 506, the computing device 102 may determine whether audio output from the one or more other computing devices that is received by the computing device exceeds a volume threshold. The computing device 102 may select from among the one or more other computing devices 104, 106 based on the audio output received by the computing device that exceeds the volume threshold.

Additionally or alternatively, in some embodiments, the computing device 102 may receive information 508 from the computing device 104 and information 510 from the computing device 106. For example, the computing device 102 may receive the information 508, 510 via a distributed context network. In some embodiments, the information 508, 510 may be configured according to a protocol of the distributed context network. In operation 512, the computing device 102 may determine a distance from the first computing device 1022 each of the other computing devices 104, 106. The computing device 102 may select from among the one or more other computing devices 104, 106 based on the distance to each other computing device on the distributed context network.

Additionally or alternatively, in some embodiments, the computing device 102 may conduct a calibration operation with each other computing device 104, 106. In some embodiments, the computing device 102 may send a message 514 to the computing device 104, and a message 516 to the computing device 106. The messages 514, 516 may be configured to cause the computing devices 104 and 106 to emit a sound at a predetermined level. In response to receiving the messages 514, 516, the computing devices 104 and 106 may emit respective sounds 518 and 520. The computing device 102 may receive and measure a volume level of each of the received sounds 518 and 520. In operation 522, the computing device 102 may select from among the one or more other computing devices 104, 106 based on measurements of the volume of the received sounds 518, 520 by each other computing device 104, 106 during (as part of) the calibration operation.

In operation 530, the computing device 102 may determine or identify that the computing device 102 has entered a high priority call state. In response to the computing device entering the high priority call state, the computing device 102 may transmit via the distributed context network a message 532 to the computing device 104, and a message 536 to the computing device 106. The messages 532 and 536 may be configured to cause the one or more other computing devices 104, 106 to reduce their respective audio output volume. In some embodiments, the messages 532 and 536 may include a priority call alert indicating that the computing devices 104 and 106 should reduce their respective audio output volume. In some embodiments, the messages 532 and 536 may include an indication that the computing device 102 has entered the high priority call state. In some embodiments, the messages 532 and 536 may include a threshold volume level, which may be the same threshold volume level, or may be a different threshold volume level for each of the computing devices 104 and 106. In operation 534, the computing device 104 may reduce its audio output volume. In operation 538, the computing device 106 may reduce its audio output volume.

In some embodiments, one of the other computing devices (e.g., computing device 104) may receive a notification 540 intended for a user of the computing device 102. The notification 540 may include, for example, a notification of an incoming call, text message, calendar reminder, a notification of an application operation or status, or another suitable notification. The computing device 104 may send information 542 regarding the notification 540 to the other computing device 102 in a manner that informs the user but does not interrupt the high priority call.

In some embodiments, one of the other computing devices (e.g., computing device 104) may receive a user input 544 to increase the audio output volume of the computing device 104. In response to receiving user input 544 to increase the audio volume output of the computing device 104, in operation 546 the computing device 104 may present confirmation request requiring a second user input before increasing the audio output.

In some embodiments, the computing device 102 may determine (identify) that the computing device 102 has exited high priority call state in operation 548. In response to exiting the high priority call state, the computing device 102 may transmit via the distributed context network a message 550 to the computing device 104, and a message 554 to the computing device 106. The messages 550 and 554 may indicate that audio output reductions are ended. In response to receiving the message 550, the computing device 104 may store an indication in memory that audio output reductions are ended in operation 552. In some embodiments, the computing device 104 may increase its audio output volume. In response to receiving the message 554, the computing device 106 may store an indication in memory that audio output reductions are ended in operation 556. In some embodiments, the computing device 106 may increase its audio output volume.

Figure 6A:
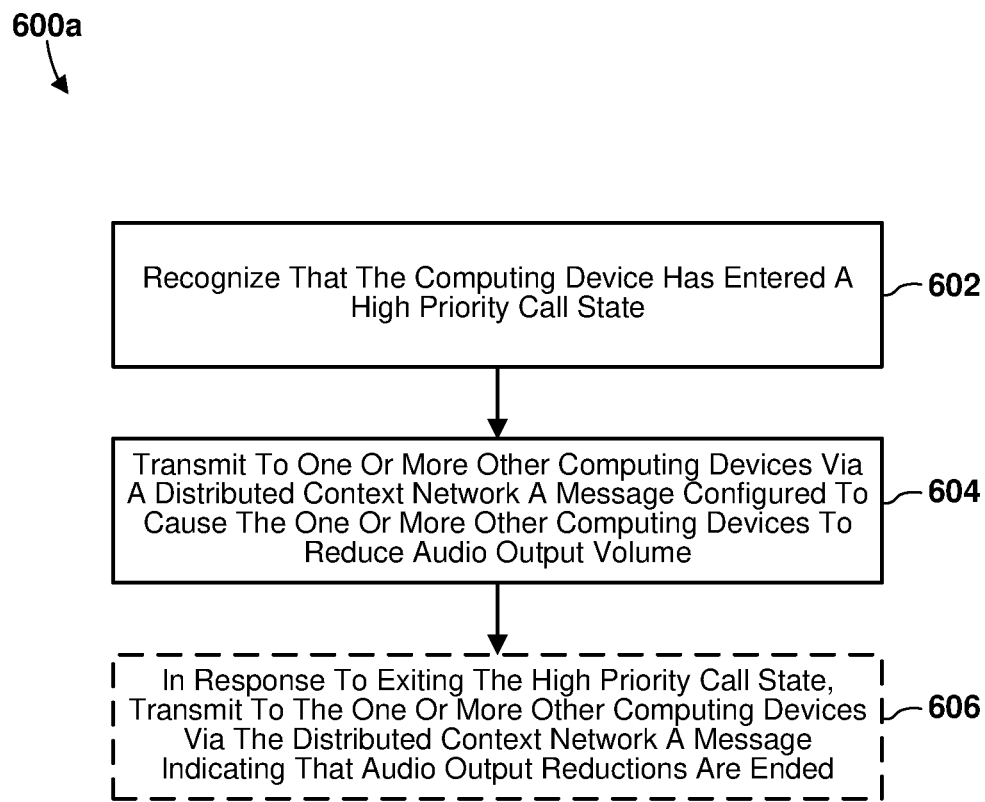
FIG. 6A is a process flow diagrams illustrating a method that may be performed by a processing device of a computing device for reducing audio interference to a call on a computing device in accordance with various embodiments.

FIG. 6A is a process flow diagrams illustrating a method 600a that may be performed by a processing device of a computing device (e.g., 102) for reducing audio interference to a call on a computing device in accordance with various embodiments. With reference to FIGS. 1-6A, means for performing each of the operations of the method 600a may include a processor (e.g., 202, 204, 210, 212, 214, 216, 218, 260, 310) of the computing device (e.g., 102), referred to herein as a "processor."

In block 602, the processor may recognize that the computing device has entered a high priority call state. In some embodiments, the processor may recognize that the computing device has entered a high priority call state when a microphone of the computing device is unmuted. In some embodiments, the processor may recognize that the computing device has entered a high priority call state in response to receiving an input from a user of the computing device.

In block 604, the processor may transmit to one or more other computing devices (e.g., 104, 106) via a distributed context network a message configured to cause the one or more other computing devices to reduce audio output volume. In some embodiments, the message may include a priority call alert indicating that the other computing device(s) should reduce their respective audio output volume. In some embodiments, the message may include an indication that the computing device (e.g., 102) has entered the high priority call state. In some embodiments, message transmitted to the one or more other computing devices may include a threshold volume level and may be configured to cause the one or more other computing devices to reduce audio output volume below the threshold volume level included in the message.

In optional block 606, in response to exiting the high priority call state, the processor may transmit to the one or more other computing devices via the distributed context network a message indicating that audio output reductions are no longer needed, such because the call is ended or the computing device microphone is muted.

FIGS. 6B-6E are process flow diagrams illustrating example operations 600b-600e that may be performed by a processing device of a computing device as part of the method 600a for reducing audio interference to a call on a computing device in accordance with various embodiments. With reference to FIGS. 1-6E, means for performing each of the operations 600b-600e may include a processor (e.g., 202, 204, 210, 212, 214, 216, 218, 260, 310) of the computing device (e.g., 102), referred to herein as a "processor."

Figure 6B:
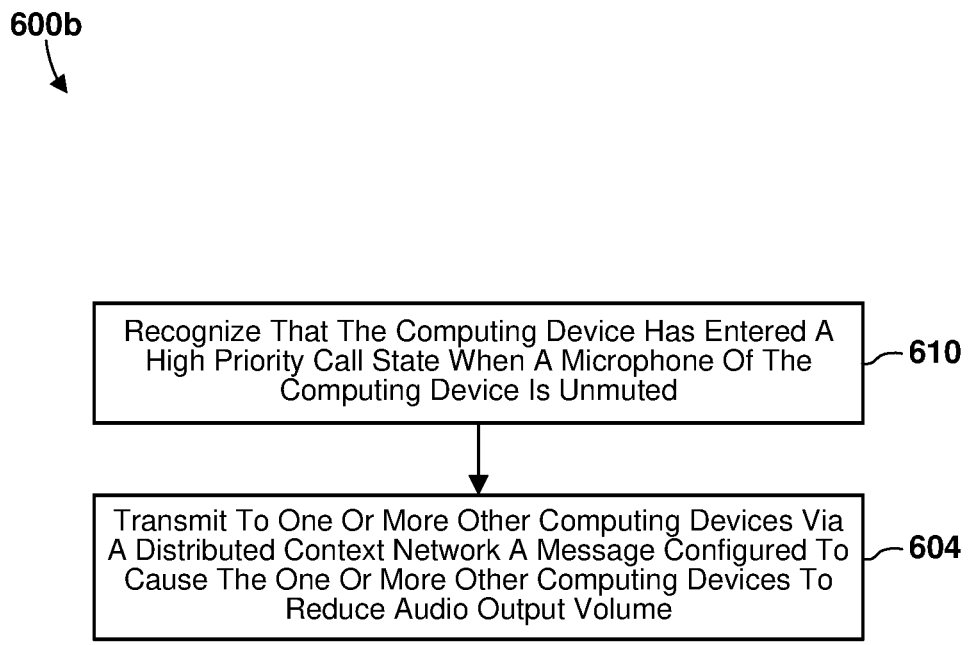
FIGS. 6B-6E are process flow diagrams illustrating example operations that may be performed by a processing device of a computing device as part of the method for reducing audio interference to a call on a computing device in accordance with various embodiments.

Referring to FIG. 6B, in block 610, the processor may recognize (determine, identify) that the computing device has entered a high priority call state when a microphone of the computing devices unmuted.

The processor may transmit to one or more other computing devices (e.g., 104, 106) via a distributed context network a message configured to cause the one or more other computing devices to reduce audio output volume in block 604, as described.

Figure 6C:
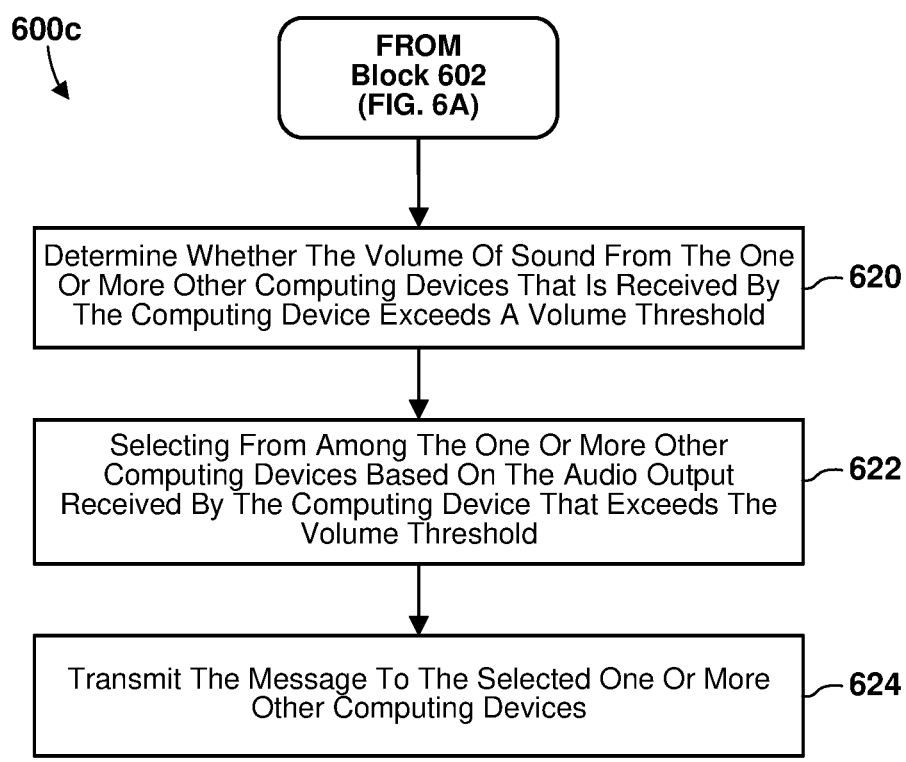

Referring to FIG. 6C, after recognizing that the computing device has entered a high priority call state in block 602 of the method 600a as described, the processor may determine in block 620 whether the volume of sound from the one or more other computing devices (e.g., 104, 106, 108) that is received by the computing device (e.g., 102) exceeds a volume threshold at or above which audio interference could be experienced.

In block 622, the processor may select from among the one or more other computing devices (e.g., 104, 106, 108) based on the volume of sound emitted by the other computing device(s) that is measured by the computing device (e.g., via a microphone) that exceeds the volume threshold.

In block 624, the processor may transmit the message to the selected one or more other computing devices.

Figure 6D:
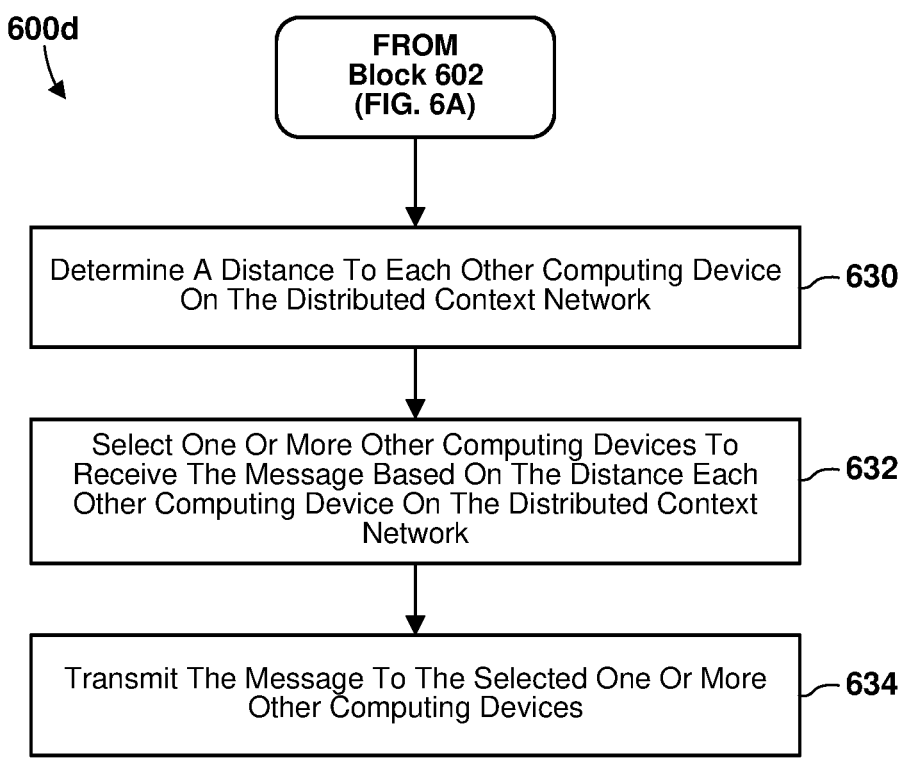

Referring to FIG. 6D, after recognizing that the computing device has entered a high priority call state in block 602 of the method 600a as described, the processor may determine a distance to each other computing device on the distributed context network in block 630.

In block 632, the processor may select, from other computing devices on the network, one or more other computing devices to receive a volume reduction request message based on the distance to each other computing device on the distributed context network.

In block 634, the processor may transmit the message to the selected one or more other computing devices.

Figure 6E:
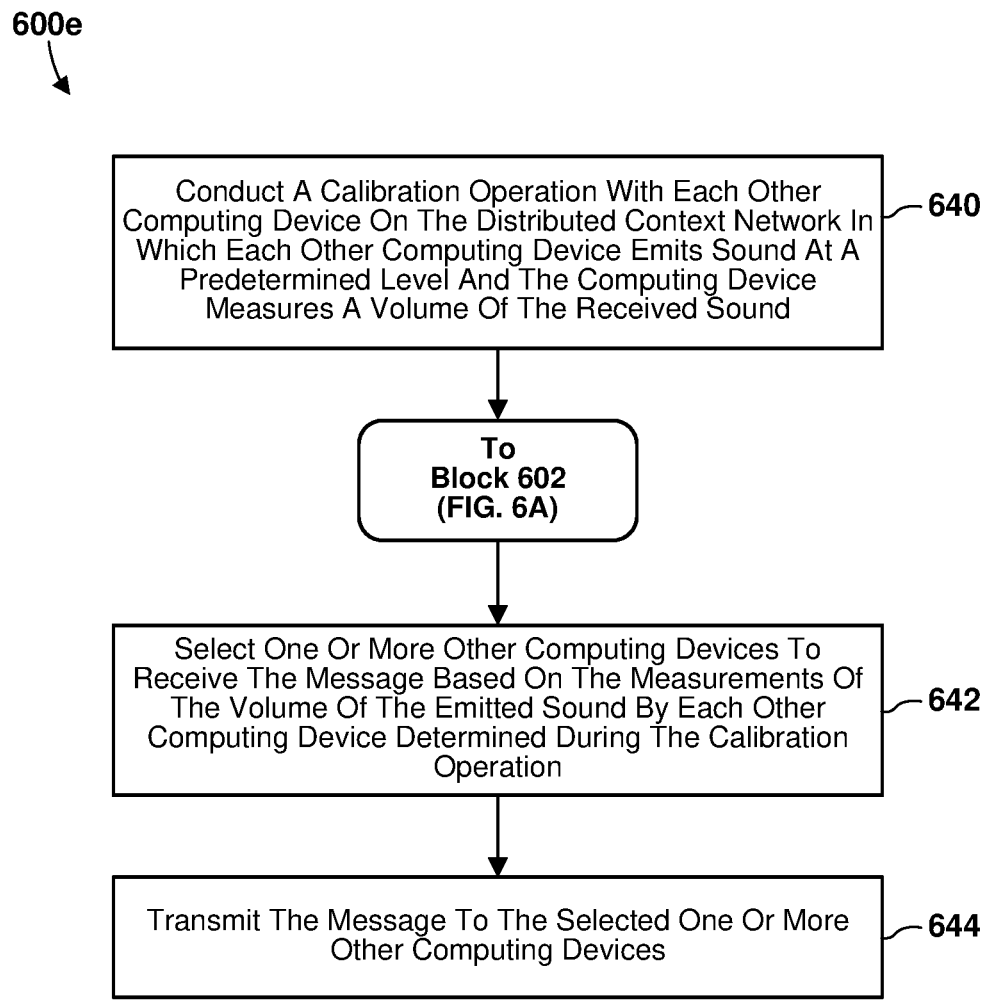

Referring to FIG. 6E, at some time prior to a priority call, the processor may conduct a calibration operation with each other computing device on the distributed context network in which each other computing device emits sound at a predetermined volume level and the computing device measures the volume of the received sound as measured by a microphone of the computing device in block 640. The measurements or determined volume threshold information for each other computing device may be stored in memory of the computing device.

Then after recognizing that the computing device has entered a high priority call state in block 602 of the method 600*a* as described, in block 642, the processor may select, from other computing devices on the network, one or more other computing devices to receive a volume reduction request message based on measurements of the volume of the received sound by each other computing device determined during the calibration operation.

In block 644, the processor may transmit the message to the selected one or more other computing devices.

Figure 7A:
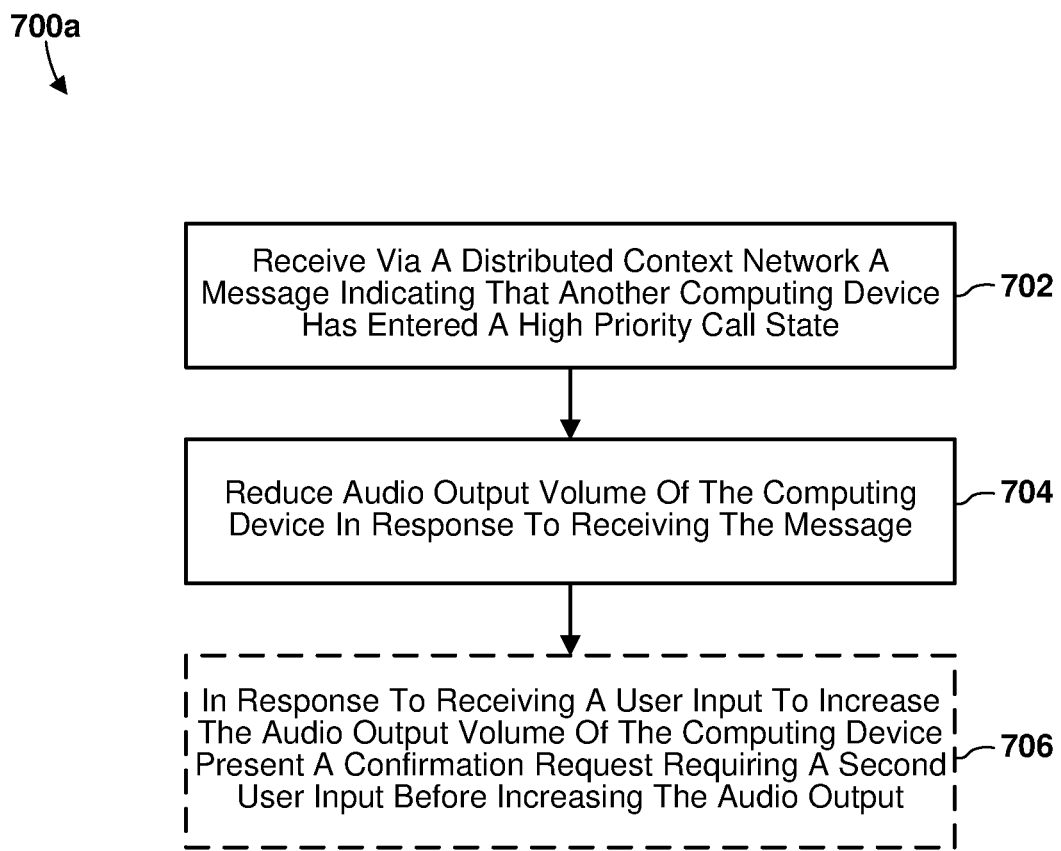
FIG. 7A is a process flow diagrams illustrating a method that may be performed by a processing device of a computing device for managing audio output of a computing device in accordance with various embodiments.

FIG. 7A is a process flow diagrams illustrating a method 700*a* that may be performed by a processing device of a computing device (e.g., 104, 106, 108) for managing audio output of a computing device in accordance with various embodiments. With reference to FIGS. 1-7A, means for performing each of the operations of the method 700*a* may include a processor (e.g., 202, 204, 210, 212, 214, 216, 218, 260, 310) of the computing device (e.g., 104, 106, 108), referred to herein as a "processor."

In block 702, the processor may receive via a distributed context network a message indicating that another computing device has entered a high priority call state. It some embodiments, the received message may indicate or include a threshold volume level.

In block 704, the processor may reduce audio output volume of the computing device in response to receiving the message. In some embodiments, the processor may reduce the audio output volume of the computing device below the threshold volume level.

In optional block 706, in response to receiving a user input to increase the audio output volume of the computing device, the processor may present a confirmation request requiring a second user input before increasing the audio output.

Figure 7B:
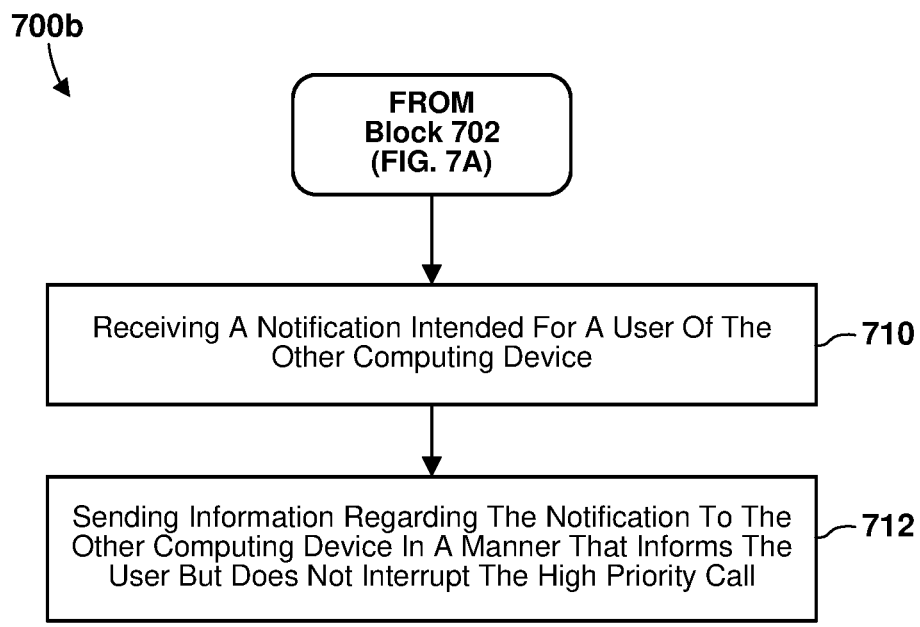
FIG. 7B is a process flow diagrams illustrating example operations that may be performed by a processing device of a computing device as part of the method for managing audio output of a computing device in accordance with various embodiments.

FIG. 7B is a process flow diagrams illustrating example operations 700*b* that may be performed by a processing device of a computing device as part of the method 700*a* for managing audio output of a computing device in accordance with various embodiments. With reference to FIGS. 1-7B means for performing each of the operations 700*b* may include a processor (e.g., 202, 204, 210, 212, 214, 216, 218, 260, 310) of the computing device (e.g., 104, 106, 108), referred to herein as a "processor."

After receiving, via a distributed context network, a message indicating that another computing device has entered a high priority call state in block 702 of the method 700*a* as described, the processor may receive a notification intended for a user of the other computing device in block 710.

In block 712, the processor may send information regarding the notification to the other computing device in a manner that informs the user but does not interrupt the high priority call.

Figure 8:
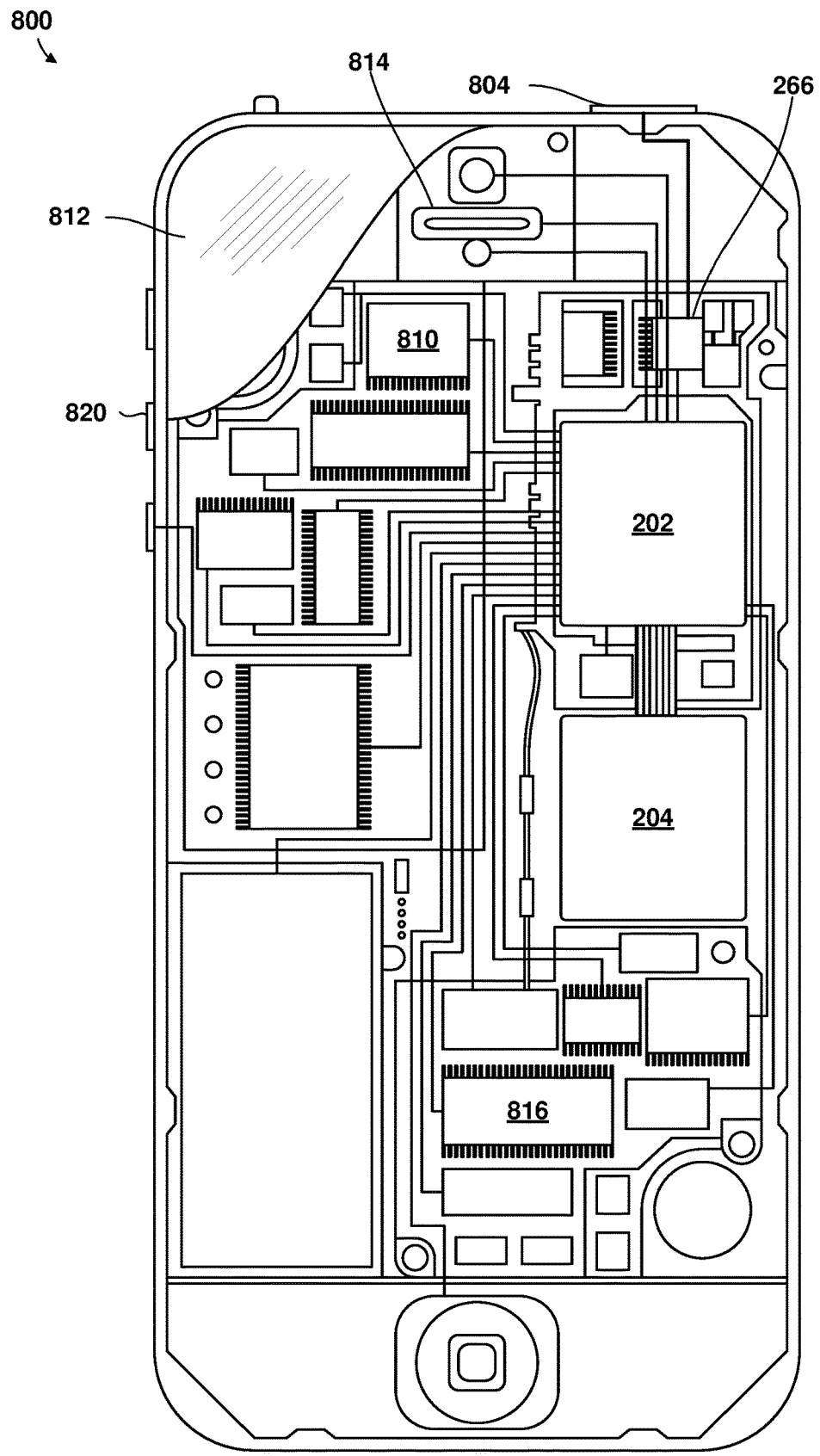
FIGS. 8-10 are component block diagrams of example computing devices suitable for use with various embodiments.

FIG. 8 is a component block diagram of an example computing device suitable for use with various embodiments. With reference to FIGS. 1-8, in some embodiments, the computing device (e.g., 102, 104, 106, 108) may be implemented in the form of a smart phone 800. In various embodiments, the smart phone 800 may be configured to perform the operations of the methods and operations 500, 600*a*-600*e*, 700*a*, and 700*b*.

The smart phone 800 may include a first SOC 202 (e.g., a SOC-CPU) coupled to a second SOC 204 (e.g., a 5G capable SOC). The first and second SOCs 202, 204 may be coupled to internal memory 816, a display 812, and to a speaker 814. Additionally, the smart phone 800 may include an antenna 804 for sending and receiving electromagnetic radiation that may be connected to a wireless data link and/or cellular telephone transceiver 266 coupled to one or more processors in the first and/or second SOCs 202, 204. The smart phone 800 may also include menu selection buttons or rocker switches 820 for receiving user inputs.

The smart phone 800 also may include a sound encoding/decoding (CODEC) circuit 810, which digitizes sound received from a microphone into data packets suitable for wireless transmission and decodes received sound data packets to generate analog signals that are provided to the speaker to generate sound. Also, one or more of the processors in the first and second SOCs 202, 204, wireless transceiver 266 and CODEC 810 may include a digital signal processor (DSP) circuit (not shown separately).

The processors of the smart phone 800 may be any programmable microprocessor, microcomputer or multiple processor chip or chips that can be configured by software instructions (applications) to perform a variety of functions, including the functions of the various embodiments described below. In some mobile devices, multiple processors may be provided, such as one processor within an SOC 204 dedicated to wireless communication functions and one processor within an SOC 202 dedicated to running other applications. Software applications may be stored in the memory 816 before they are accessed and loaded into the processor. The processors may include internal memory sufficient to store the application software instructions.

Figure 9:
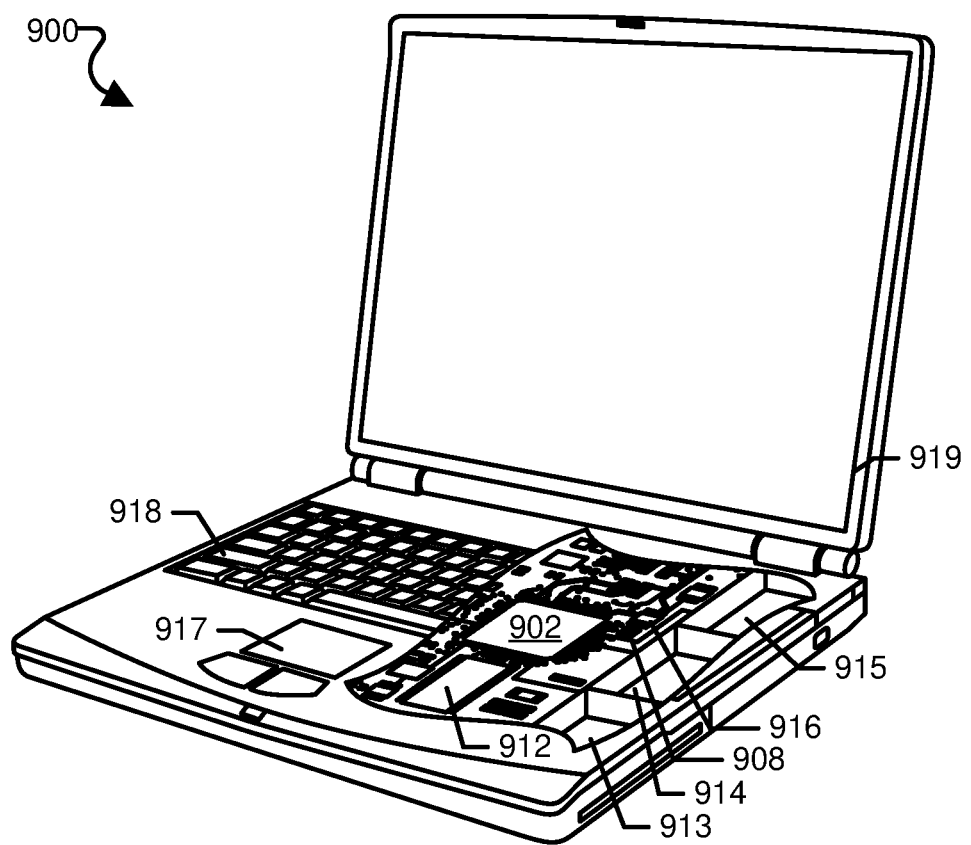

FIG. 9 is a component block diagram of an example computing device suitable for use with various embodiments. With reference to FIGS. 1-9, in some embodiments, the computing device (e.g., 102, 104, 106, 108) may be implemented in the form of a laptop computer 900. In various embodiments, the laptop computer 900 may be configured to perform the operations of the methods and operations 500, 600*a*-600*e*, 700*a*, and 700*b*.

In various embodiments, the laptop computer 900 may include a touchpad (or trackpad) touch surface 917 that serves as the computer's pointing device, and thus may receive pinch in, pinch out, drag, scroll, flick gestures, etc. similar to those that may be implemented on computing devices equipped with a touch screen display. The laptop computer 900 may include a processor 902 coupled to volatile memory 912 and a large capacity nonvolatile memory, such as a disk drive 913 of Flash memory. Additionally, the laptop computer 900 may include one or more antenna 908 for sending and receiving electromagnetic radiation that may be connected to a wireless data link and/or cellular telephone transceiver 916 coupled to the processor 902. The laptop computer 900 may also include a transceiver 914 implementing short range wireless communication using a variety of short-range communication protocols, such as any of the Institute of Electrical and Electronics Engineers (IEEE) 802.11 and 802.15 protocols. The laptop computer 900 also may include a compact disc (CD) drive 915 coupled to the processor 902. The laptop computer 900 may include a touchpad 917, a keyboard 918, and a display 919 all coupled to the processor 902. Other configurations of the laptop computer 900 may include a computer mouse or trackball coupled to the processor (e.g., via a Universal Serial Bus (USB) input) as are well known, which may also be used in conjunction with various embodiments.

Figure 10:
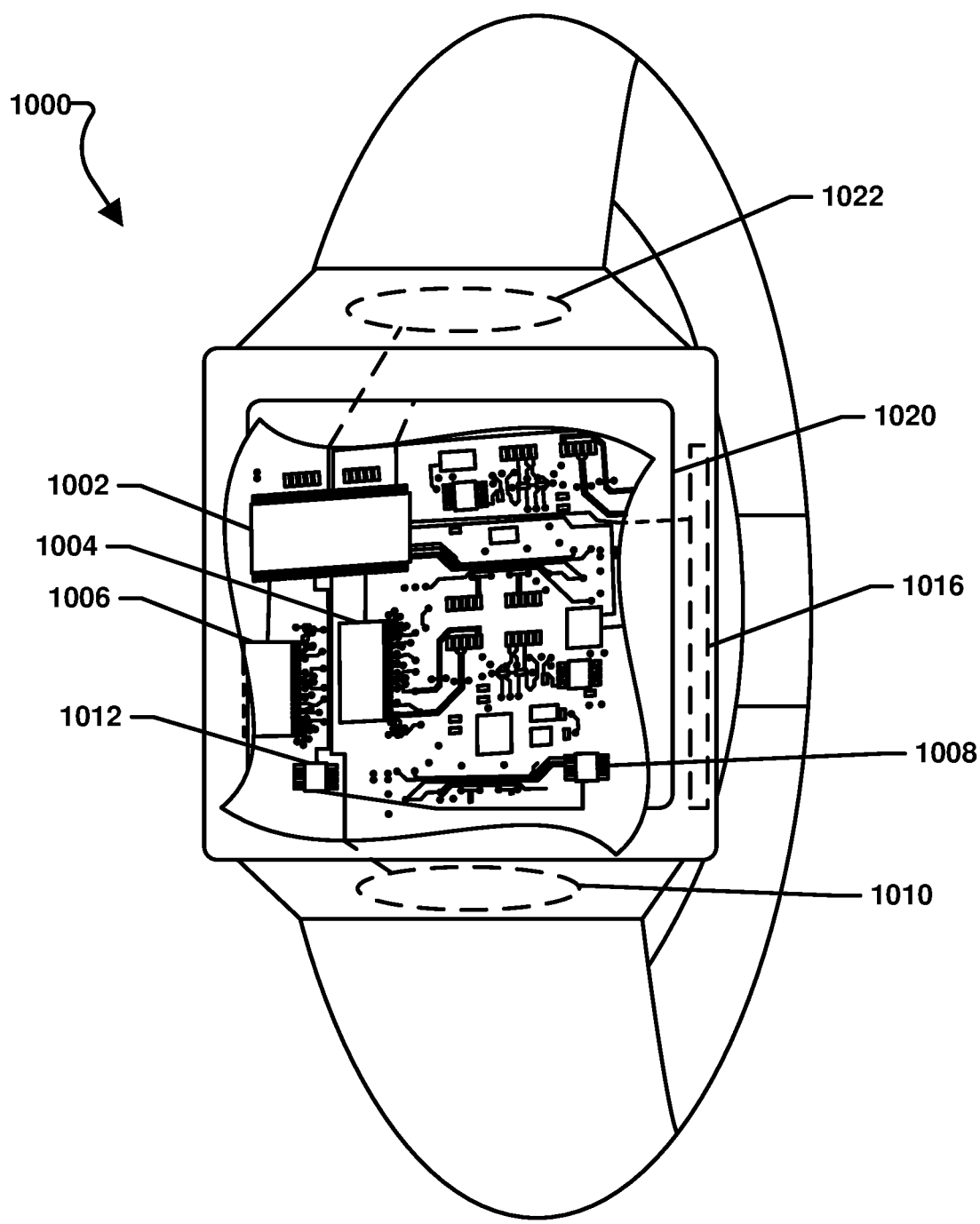

FIG. 10 is a component block diagram of an example computing device suitable for use with various embodiments. With reference to FIGS. 1-10, in some embodiments, the computing device (e.g., 102, 104, 106, 108) may be implemented in the form of a smart watch 1000. In various embodiments, the smart watch 1000 may be configured to perform the operations of the methods and operations 500, 600a-600e, 700a, and 700b.

The smart watch 1000 may include an SoC 1002 including two or more processors (e.g., application processor, low power processor) coupled to internal memories 1004 and 1006. Internal memories 1004, 1006 may be volatile or non-volatile memories, and may also be secure and/or encrypted memories, or unsecure and/or unencrypted memories, or any combination thereof. The SoC 1002 may also be coupled to a touchscreen display 1020, such as a resistive-sensing touchscreen, capacitive-sensing touchscreen infrared sensing touchscreen, or the like. Additionally, the smart watch 1000 may have one or more antenna 1008 for sending and receiving electromagnetic radiation that may be connected to one or more wireless data links 1012, such as one or more Bluetooth® transceivers that may be coupled to the SoC 1002.

The smart watch 1000 may also include physical and/or virtual buttons 1022 and 1010 for receiving user inputs as well as a slide sensor 1016 for receiving user inputs. The touchscreen display 1020 may be coupled to a touchscreen interface module that is configured receive signals from the touchscreen display 1020 indicative of locations on the screen where a user's fingertip or a stylus is touching the surface and output to the SoC 1002 information regarding the coordinates of touch events. The physical and/or virtual buttons 1022 and touchscreen display 1020 may be configured to receive an input such as pinch in, pinch out, drag, scroll, flick gestures, etc. Further, the SoC 1002 may be configured with processor-executable instructions to correlate images presented on the touchscreen display 1020 with the location of touch events received from the touchscreen interface module in order to detect when a user has interacted with a graphical interface icon, such as a virtual button.

The SoC 1002 may be any programmable microprocessor, microcomputer or multiple processor chip or chips that can be configured by software instructions (applications) to perform a variety of functions, including the functions of various embodiments. In some devices, multiple processors may be provided, such as one processor dedicated to wireless communication functions and one processor dedicated to running other applications. Typically, software applications may be stored in an internal memory before they are accessed and loaded into the SoC 1002. The SoC 1002 may include internal memory sufficient to store the application software instructions. In many devices the internal memory may be a volatile or nonvolatile memory, such as flash memory, or a mixture of both. For the purposes of this description, a general reference to memory refers to memory accessible by the SoC 1002 including internal memory or removable memory plugged into the wearable device and memory within the SoC 1002 itself.

The processors of the smart phone 800, the laptop computer 900, and the smart watch 1000 may be any programmable microprocessor, microcomputer, or multiple processor chip or chips that can be configured by software instructions (applications) to perform a variety of functions, including the functions of various embodiments described. In some computing devices, multiple processors may be provided, such as one processor within first circuitry dedicated to wireless communication functions and one processor within second circuitry dedicated to running other applications. Software applications may be stored in the memory before they are accessed and loaded into the processor. The processors may include internal memory sufficient to store the application software instructions.

Implementation examples are described in the following paragraphs. While some of the following implementation examples are described in terms of example methods, further example implementations may include: the example methods discussed in the following paragraphs implemented by a computing device comprising a processor configured with processor-executable instructions to perform operations of the methods of the following implementation examples; the example methods discussed in the following paragraphs implemented by a computing device comprising means for performing functions of the methods of the following implementation examples; and the example methods discussed in the following paragraphs may be implemented as a non-transitory processor-readable storage medium having stored thereon processor-executable instructions configured to cause a processor of a computing device to perform the operations of the methods of the following implementation examples.

Example 1. A method of reducing audio interference to a call on a computing device, including, in response to the computing device entering a high priority call state, transmitting to one or more other computing devices via a distributed context network a message configured to cause the one or more other computing devices to reduce audio output volume.

Example 2. The method of example 1, further including recognizing that the computing device has entered a high priority call state when a microphone of the computing device is unmuted.

Example 3. The method of either of examples 1 and 2, in which the message transmitted to the one or more other computing devices includes a priority call alert indicating that the one or more other computing devices should reduce respective audio output volume.

Example 4. The method of any of examples 1-3, in which the message transmitted to the one or more other computing devices includes a threshold volume level and is configured to cause the one or more other computing devices to reduce audio output volume below the threshold volume level included in the message.

Example 5. The method of any of examples 1-4, further including determining whether audio output from the one or more other computing devices that is received by the computing device exceeds a volume threshold, selecting one or more other computing devices based on the audio output received by the computing device that exceeds the volume threshold, and transmitting the message to the selected one or more other computing devices.

Example 6. The method of any of examples 1-5, further including determining a distance to each other computing device on the distributed context network, selecting one or more other computing devices based on the distance to each other computing device on the distributed context network, and transmitting the message to the selected one or more other computing devices.

Example 7. The method of any of examples 1-6, further including conducting a calibration operation with each other computing device on the distributed context network in which each other computing device emits sound at a predetermined level and the computing device measures a volume of the received sound, selecting one or more other computing devices based on measurements of the volume of the received sound by each other computing device determined during the calibration operation, and transmitting the message to the selected one or more other computing devices.

Example 8. The method of any of examples 1-7, further including, in response to exiting the high priority call state, transmitting to the one or more other computing devices via the distributed context network a message indicating that audio output reductions are ended.

Example 9. A method of managing audio output of a computing device, including receiving via a distributed context network a message indicating that another computing device has entered a high priority call state, and reducing audio output volume of the computing device in response to receiving the message.

Example 10. The method of example 9, in which reducing audio output volume of the computing device includes reducing audio volume of the computing device below a threshold volume level.

Example 11. The method of example 10, in which the threshold volume level is indicated in the received message.

Example 12. The method of any of examples 9-11, further including in response to receiving the message indicating that the other computing device has entered the high priority call state receiving a notification intended for a user of the other computing device, and sending information regarding the notification to the other computing device in a manner that informs the user but does not interrupt the high priority call.

Example 13. The method of any of examples 9-12, further including in response to receiving a user input to increase the audio output volume of the computing device presenting a confirmation request requiring a second user input before increasing the audio output.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods may be substituted for or combined with one or more operations of the methods.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the spirit or scope of the claims. Thus, the present disclosure is not intended to be limited to the embodiments shown herein but is to be accorded the widest scope consistent with the following claims and the principles and novel features disclosed herein.

What is claimed is:

1. A method of reducing audio interference to a call on a computing device, comprising:
   receiving a call at the computing device;
   determining to enter a high priority call state, in response to receiving the call, based on one or more call parameters comprising any combination of:
      a phone number associated with the call;
      a conversation identifier associated with the call; and
      a priority indicator associated with the call;
   in response to the computing device entering a high priority call state, transmitting to one or more other computing devices, via a distributed context network, a first distributed context network message configured to cause the one or more other computing devices to reduce audio output volume, wherein the first distributed context network message comprises:
      a device name, type, and or identifier of the computing device;
      a priority call alert indicating that the computing device is in a high priority call state; and
      a request parameter indicating a threshold volume level below which the one or more computing devices are requested to reduce audio output volume;
   receiving, while the computing device is in the high priority call state, from a first device of the one or more other computing devices, an indication of a user notification received by the first device; and
   informing a user of the computing device of the user notification received by the first device while the computing device is in the high priority call state;
   determining to exit the high priority call state;
   in response to the computing device exiting the high priority call state, transmitting to the one or more other computing devices, via the distributed context network, a second distributed context network message indicating that audio output reductions are ended.

2. The method of claim 1, further comprising recognizing that the computing device has entered a high priority call state when a microphone of the computing device is unmuted.

3. The method of claim 1, further comprising:
   determining whether audio output from the one or more other computing devices that is received by the computing device exceeds a volume threshold;
   selecting one or more other computing devices based on the audio output received by the computing device that exceeds the volume threshold; and
   transmitting the message to the selected one or more other computing devices.

4. The method of claim 1, further comprising:
   determining a distance to each other computing device on the distributed context network;
   selecting one or more other computing devices based on the distance to each other computing device on the distributed context network; and
   transmitting the message to the selected one or more other computing devices.

5. The method of claim 1, further comprising:
   conducting a calibration operation with each other computing device on the distributed context network in which each other computing device emits sound at a predetermined level and the computing device measures a volume of the received sound;
   selecting one or more other computing devices based on measurements of the volume of the received sound by each other computing device determined during the calibration operation; and
   transmitting the message to the selected one or more other computing devices.

6. A computing device, comprising:
   a processor configured with processor-executable instructions to:
   receive a call at the computing device;
   determine to enter a high priority call state, in response to receiving the call, based on one or more call parameters comprising any combination of:
      a phone number associated with the call;
      a conversation identifier associated with the call; and
      a priority indicator associated with the call;
   in response to the computing device entering a high priority call state, transmit to one or more other computing devices, via a distributed context network, a first distributed context network message configured to cause the one or more other computing devices to reduce audio output volume, wherein the first distributed context network message comprises:
      a device name, type, and or identifier of the computing device;
      a priority call alert indicating that the computing device is in a high priority call state; and
      a request parameter indicating a threshold volume level below which the one or more computing devices are requested to reduce audio output volume;
   receive, while the computing device is in the high priority call state, from a first device of the one or more other computing devices, an indication of a user notification received by the first device; and
   inform a user of the computing device of the user notification received by the device while the computing device is in the high priority call state;
   determine to exit the high priority call state;
   in response to the computing device exiting the high priority call state, transmit to the one or more other computing devices, via the distributed context network, a second distributed context network message indicating that audio output reductions are ended.

7. The computing device of claim 6, wherein the processor is further configured with processor-executable instructions to recognize that the computing device has entered a high priority call state when a microphone of the computing device is unmuted.

8. The computing device of claim 6, wherein the processor is further configured with processor-executable instructions to:
   determine whether audio output from the one or more other computing devices that is received by the computing device exceeds a volume threshold;

select one or more other computing devices based on the audio output received by the computing device that exceeds the volume threshold; and transmit the message to the selected one or more other computing devices.

9. The computing device of claim 6, wherein the processor is further configured with processor-executable instructions to:

determine a distance to each other computing device on the distributed context network;

select one or more other computing devices based on the distance to each other computing device on the distributed context network; and transmit the message to the selected one or more other computing devices.

10. The computing device of claim 6, wherein the processor is further configured with processor-executable instructions to:

conduct a calibration operation with each other computing device on the distributed context network in which each other computing device emits sound at a predetermined level and the computing device measures a volume of the received sound;

select one or more other computing devices based on measurements of the volume of the received sound by each other computing device determined during the calibration operation; and transmit the message to the selected one or more other computing devices.

* * * * *